Patented Oct. 3, 1950 2,524,076

UNITED STATES PATENT OFFICE 2,524,076

SEALING COMPOSITION FOR OPTICAL ASSEMBLIES

Marco Petronio, Philadelphia, Pa.

No Drawing. Application December 3, 1948, Serial No. 63,431

4 Claims. (Cl. 260—28.5)

(Granted under the act of March 3, 1883, as amended April 30, 1928; 370 O. G. 757)

The invention described in the specification and claims may be manufactured and used by or for the Government for governmental purposes without the payment to me of royalty thereon.

This application is a continuation-in-part of application Serial No. 692,944, now abandoned, which I filed on August 26, 1946, under the same title.

The present invention relates to improvements in sealing compositions for use in optical assemblies wherein those materials are utilized to seal optical elements in position within their holders so as to prevent moisture, air, dust particles and the like from gaining entrance into closed chambers of the instrument.

Broadly stated, the object of my invention is to supply a sealing composition which is pliable at room temperatures, and yet will neither soften below a temperature of about 220° F. nor crack above a temperature of about —50° F.

A more specific object is to provide a sealing composition for optical assemblies which will enable the universal use of instruments in torrid or arctic regions without causing the sealing composition to melt or crack respectively.

Another object is to provide a sealing composition which is relatively simple to make, consists of readily available materials, and is comparatively cheap to manufacture.

Until recently, the composition known to be most widely used for sealing optical assemblies in position within their holders was one which was found to soften above a temperature of approximately 155° F. and which was also found to crack or flake at temperatures below 0° F.

This type of prior art sealing composition has been quite satisfactory for use in sealing optical assemblies that were to be utilized in most world-wide regions. Occasionally, when it was found necessary to mount an optical assembly in an instrument intended for use in higher temperature zones, it was the practice to employ an even higher melting point composition. Conversely, another composition, specifically prepared to avoid cracking at lower temperatures, was used in assemblies intended for operation in extremely cold zones.

This practice obviously was very uneconomical because two specific types of compositions had to be prepared from separate and different ingredients, whereas, if a single all-temperature range composition were available, much saving in the cost of manufacture would be achieved. Moreover, it meant that instruments having to be assembled could not be used universally, but instead would have to be restricted to use in temperature zones of one extreme or another. From the standpoint of economic or military efficiency this was a most undesirable situation. Notwithstanding this fact, the instrument industry apparently never sought, or at least never produced such a universal sealing composition.

However, this problem was given great emphasis by the global nature of the recently terminated World War II. During that conflict, the United States armed forces found themselves confronted with the problem of sending optical and other instruments to equatorial battle zones, then reshipping them to arctic areas as the needs of the forces changed, or vice versa. At a time when speed plus a shortage of materials made it impossible to provide instruments which were assembled with sealing compositions specifically intended for usage in either hot or cold areas, as was the former practice, the need for the aforementioned universal type of sealing material became acute.

To solve this problem other workers attempted to use high melting point waxes or other materials which would enable the composition to resist solution in temperatures over 210° F. But those substances invariably were found to be incapable of standing up under temperatures below 0° F. On the other hand, when experimenters started with sealing components capable of surviving those low temperatures, they found that the high temperature qualifications were absent. Attempts at merely blending high and low temperature ingredients together failed to furnish a satisfactory solution, also.

Following considerable investigation I discovered a sealing composition, later to be described, that has proven capable of satisfying the need for a material that can be universally utilized. This composition has fully met all of the military's world-wide temperature requirements, as a result of which, it was adopted by the United States armed forces as the standard sealing composition for their optical and other instrument assemblies.

*Composition and method of preparation*

My improved sealing composition essentially consists of between 35 to 45% of a hydrogenated rosin, between 28 to 32% of a micro-crystalline mineral wax, between 15 to 20% of a high melting point wax (melting point between 284 and 287.6° F.), 1 to 4% rubber, 2 to 3% of a plasticizer such as dibutyl sebacate or n-butyl phthalate, about 1% lampblack (or carbon black) and 1% of some fungicide such as pentachlorphenol. For these various ingredients there are numerous available materials and sources wherefrom they may be obtained. Any one of a number of commercially available mineral waxes, plasticizers and fungicides may be employed. However, I have found that for the required rubber and high melting point wax ingredients there are certain preferred constituents. Although both natural and synthetic rubbers are usable, of a large number of various types of rubber experimented with it was found that synthetic polybutene rubber gave markedly superior results. An example of such a polybutene rubber is "Vistanex," a material described in The Condensed Chemical Dictonary (Reinhold Pub. Co., 3d ed., 1942) as a linear polymer of isobutylene and having a softening point of 250° F. The Standard Oil Company of New Jersey markets four types of "Vistanex," identifying them as "Polybutenes B–60, B–80, B–100, B–120," the numbers respectively corresponding to polybutene rubber having molecular weights of 60,000; 80,000; 100,000; and 120,000. I have employed each of these four rubbers in my novel composition, and have found that each one gave equally satisfactory results. As to the high melting point wax, the one actually employed in my novel composition was "Acrawax C," a material which has a melting point of between 284°–287.6° F., and which is manufactured and sold by Glyco Products Company, Inc., of Brooklyn, New York.

I have found it preferable in making my composition from the abovementioned components to utilize the following formulation:

| | Per cent |
|---|---|
| Hydrogenated rosin | 40 |
| Micro-crystalline mineral wax | 32 |
| High melting-point wax | 18 |
| Polybutene rubber-micro crystalline mineral wax mixture (50–50) | 5 |
| Dibutyl sebacate | 2.5 |
| Carbon black | 1.5 |
| Pentachlorphenol | 1.0 |

The method of preparation which I have developed and found to be most satisfactory for manufacturing my novel sealing composition incorporates the following steps. First, the abovementioned mixture consisting of equal portions of rubber and micro-crystalline mineral wax is made by blending those components together, with the aid of steam-heated rollers maintained at 150° to 160° F., until a uniform product is obtained. This product is removed from the rollers and cut into small pieces to facilitate the next step which is the process of its solution.

The micro-crystalline mineral wax is melted together with the hydrogenated rosin and high melting-point wax in a suitable container. This hot wax mixture is divided into two equal portions, to one of which is added the cut pieces of the blend earlier mentioned. When this blend is thus completely dissolved, the second portion of the hot mixture is incorporated therein.

The lampblack is dispersed as completely as possible in a small quantity of the above wax and rubber mixture while hot, and the resultant product is added to the remaining wax-rubber composition. At this point, addition is made of the dibutyl sebacate followed by the pentachlorphenol fungicide. Since these materials are very volatile, especially the fungicide, certain precautions must be taken. The dibutyl sebacate and the fungicide should be carefully added while the wax-rubber mixture is still in its molten state, but the source of heat must be entirely removed from the mixture prior to the addition of the fungicide. This final mixture may then be poured into suitable containers, preferably lined with thin sheets of cellophane, and allowed to cool. In this form of packaging, the sealing composition is easily removed from the container and readily made available for use.

*Characteristics of my improved sealing composition*

The sealing material having the composition and prepared in the manner just described has been proved capable of obtaining all the objectives mentioned at the beginning of this specification. For example, the composition's softening point, as determined by standard methods of the American Society for Testing Materials (A. S. T. M. method D5–25) was found to be a minimum of 220° F. By means of another A. S. T. M. test (D36–26), generally termed "needle penetration," a value of 20 to 30 was obtained, indicating that my superior sealing material has excellent working properties at room temperatures, as for example 70° F.–75° F.

Upon refrigerating my novel sealing composition at a temperature of −50° F. for relatively long periods of time it was conclusively determined that the material will not crack, chip or flake at that temperature. Laboratory tests and extensive military use all over the world have also shown that my here-disclosed composition has excellent sealing qualities. Furthermore, instruments containing various types of optical assemblies or constructions, in which my composition was employed, have been found on examination to have their interior chambers surprisingly free from contamination by moisture, dust, fungi or other matter after being exposed to various adverse conditions over considerably long periods of time.

*Summary*

From the foregoing, it will be seen that I have provided a sealing composition for use in sealing optical assemblies within their instrument holders that prevents moisture, air, dust particles and the like from gaining entrance into closed chambers of the instrument; that I have supplied a sealing composition that is pliable at room temperatures, and yet will neither soften below a temperature of about 220° F. nor crack at a temperature of about −50° F.; that I have provided a sealing composition for optical assemblies which will enable the universal use of instruments in torrid or arctic regions without causing the sealing composition to melt or crack, respectively; and that I have provided a sealing composition which is relatively simple to make, consists of readily available materials, and is comparatively cheap to manufacture.

Although my improved composition has been described as containing certain specific materials, I have found, and it will readily be apparent to those skilled in this art, that substitute materials may be used for some of the ingredients without departing from the spirit and intent of my invention. Some of these substitute materials have been described earlier in this specification.

My inventive improvements are therefore extensive in their adaption and are not to be restricted to the specific form here disclosed by way of illustration.

I claim:

1. As a new article of manufacture, a sealing composition for optical and other instruments comprising a homogeneous mixture of at least 15 parts by weight of a wax whose melting point is between about 284° F. and about 287.6° F., together with hydrogenated rosin, a micro-crystalline mineral wax, polybutene rubber, and a plasticizer in such varying proportions as to provide a composition that is pliable at an average room temperature of between 70°–75° F. yet has a softening point of 220° F. and a cracking point of —50° F.

2. As a new article of manufacture, a sealing composition for optical and other instruments comprising 35 to 45 parts of an hydrogenated rosin, 28 to 32 parts of a micro-crystalline mineral wax, 15 to 20 parts of a wax whose melting point is between 284° F. and 287.6° F., 1 to 4 parts of polybutene rubber, 0.5 to 5 parts lampblack, 2 to 3 parts dibutyl sebacate, and 1 part of a fungicide.

3. As a new article of manufacture, a sealing composition for optical or other instruments comprising 35 to 45 parts of an hydrogenated rosin, 28 to 32 parts of a micro-crystalline mineral wax, 15 to 20 parts of a wax whose melting point is between 284° F. and 287.6° F., 1 to 4 parts polybutene rubber, 0.5 to 5 parts carbon black, 2 to 3 parts n-butyl phthalate, and 1 part pentachlorphenol.

4. A sealing composition consisting essentially of:

| | Per cent |
|---|---|
| Hydrogenated rosin | 40 |
| Micro-crystalline mineral wax | 32 |
| Wax whose melting point is between 284° F. and 287.6° F. | 18 |
| Polybutene rubber-micro-crystalline mineral wax mixture (50–50) | 5 |
| Dibutyl sebacate | 2.5 |
| Carbon black | 1.5 |
| Pentachlorphenol | 1.0 |

MARCO PETRONIO.

REFERENCES CITED

The following references are of record in the file of this patent:

UNITED STATES PATENTS

| Number | Name | Date |
|---|---|---|
| 1,445,284 | Bell et al. | Feb. 13, 1923 |
| 2,142,039 | Abrams et al. | Dec. 27, 1938 |
| 2,394,894 | Burgert et al. | Feb. 12, 1946 |